April 14, 1925.
F. THORNTON, JR
1,533,282
PROTECTIVE SYSTEM FOR HEATING DEVICES
Filed June 16, 1922
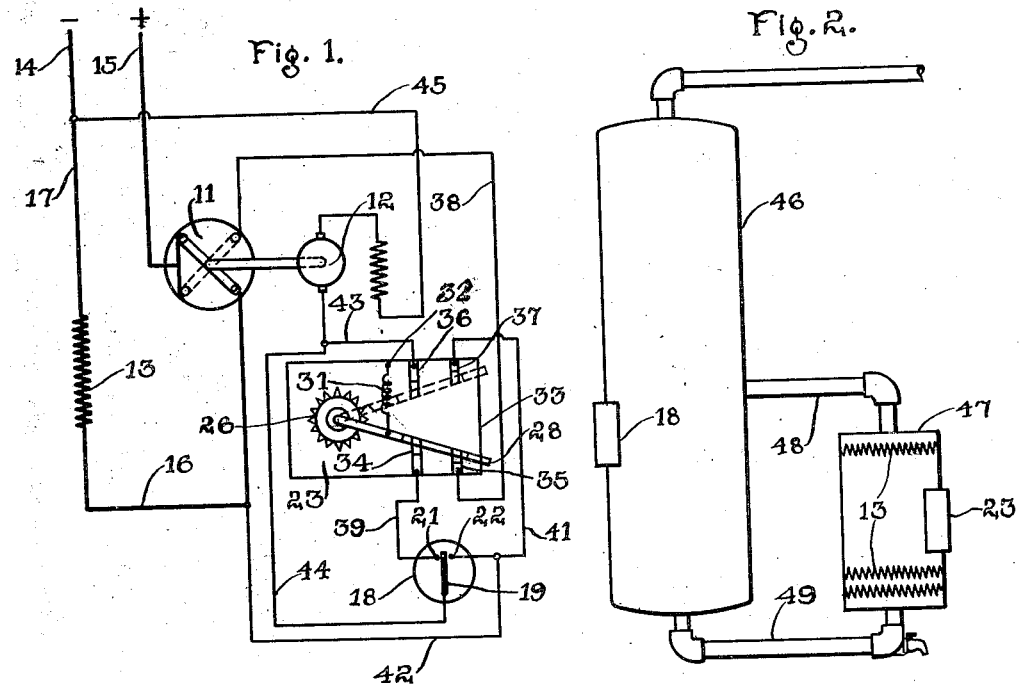
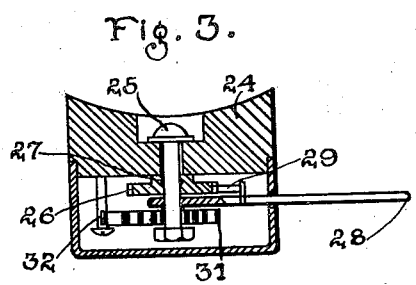
WITNESSES:
C. M. Cochran
N. M. Biebel
INVENTOR
Frank Thornton, Jr.
BY
Wesley G. Carr
ATTORNEY Patented Apr. 14, 1925.

1,533,282

UNITED STATES PATENT OFFICE.

FRANK THORNTON, JR., OF WILKINSBURG, PENNSYLVANIA, ASSIGNOR TO WESTINGHOUSE ELECTRIC & MANUFACTURING COMPANY, A CORPORATION OF PENNSYLVANIA.

PROTECTIVE SYSTEM FOR HEATING DEVICES.

Application filed June 16, 1922. Serial No. 568,707.

*To all whom it may concern:*

Be it known that I, FRANK THORNTON, Jr., a citizen of the United States, and a resident of Wilkinsburg, in the county of Allegheny and State of Pennsylvania, have invented a new and useful Improvement in Protective Systems for Heating Devices, of which the following is a specification.

My invention relates to control systems and particularly to temperature-control systems, and it has for one of its objects to provide a relatively simple control system that shall be effective to limit the temperature of a heating means.

Another object of my invention is to provide an auxiliary thermostat under the thermal control of the heating means for disabling a main thermostat and for causing the heating means to be de-energized upon the occurrence of a predetermined temperature in the heating means.

In practicing my invention, I provide an electrical heating element, a thermostat under the thermal influence of the heated medium or device, a motor-operated means for controlling the energization of the heating element, and a temperature-limiting device under the direct thermal influence of the heating element that disables the main thermostat and simultaneously causes the motor-operated means to de-energize the heating element upon the occurrence of a predetermined temperature therein.

In the single sheet of drawings,

Figure 1 is a diagram of the system embodying my invention;

Fig. 2 is a schematic representation of a water-heating system with which there is operatively associated, the system embodying my invention; and Fig. 3 is a cross-sectional view of a temperature-limiting device comprising a part of the system embodying my invention.

Referring more particularly to Fig. 1 of the drawing, I have illustrated a snap switch 11 operated by a motor 12, operatively connected thereto, which is employed to control the energization of a heating element 13 which may be operatively associated with any furnace or apparatus which is to be electrically heated. The motor-operated snap switch will not be further described in detail as it is disclosed and claimed in a co-pending application of R. A. Bolze and E. W. Denman, Serial No. 328,033, filed October 2, 1919, and assigned to the Westinghouse Electric & Manufacturing Company.

A suitable source of supply comprises conductors 14 and 15, which latter is connected to two terminals of the snap switch 11, one of the other terminals of which is connected to one end of the heating element 13 by a conductor 16. A conductor 17 connects the other end of the heating element 13 to supply-circuit conductor 14.

A main thermostatic member 18, operatively associated with a medium or the device which is to be electrically heated comprises a bi-metallic strip 19 and adjustable contact terminal members 21 and 22, which are selectively engaged by the free end of the strip 19.

An auxiliary thermally-controlled means 23, operatively associated with, and directly thermally influenced by, the electric heating element 13, may comprise any one of a variety of means, but is here represented as comprising a suitable insulating and heat-conducting block 24 in which is mounted a fixed metallic supporting member 25. A ratchet wheel 26 is secured to the member 25, which is here illustrated as of substantially bolt shape, by a quantity 27 of a suitable securing means, such as solder. A lever arm 28 is mounted on the member 25 to have a turning movement thereon relatively thereto and carries a pawl 29, which operatively engages the ratchet wheel 26. A spring member 31 has one end secured to the lever 28 and has its other end secured to a suitable stationary means 32, here illustrated as a stud or bolt extending into, and held by, the member 24.

The operation of this part may be briefly described as follows: As the member 25 is fixed in position relatively to the support 24, the ratchet wheel 26 is held in a fixed position as long as the temperature of the device is not sufficiently high to cause the solder joint 27 to soften and to permit relative movement of the two members. The inner end of the spring 31 being operatively connected to the lever 28, when the lever occupies the position illustrated by the full lines in Fig. 1, the spring 31 is placed under tension. No movement of the lever 28 results because of the coaction of the pawl 29 and the ratchet wheel 26, but, if the temperature of the device becomes sufficiently high to cause a softening of the solder joint, the ratchet wheel 26 is caused to rotate on the member 25 by the action of the spring upon the lever 28. The lever 28 is thereby permitted to move to the position indicated by the broken lines in Fig. 1, thereby interrupting one control circuit and closing another, as will be hereinafter set forth in detail. The lever 28 is automatically thermally actuated to be operatively disengaged from terminals 34 and 35 but must be moved manually to re-engage these terminals.

The member 24 may be mounted on, or comprise a part of, a suitable mounting plate 33 of any suitable insulating material, upon which may be mounted a plurality of contact terminals 34, 35, 36 and 37, which are electrically connected as will be hereinafter set forth. A conducting portion is provided on the lever 28 to electrically connect the terminals 34 and 35 or the terminals 36 and 37.

One of the terminals of the switch 11 is connected, by a conductor 38, to the switch terminal 35. The terminal 34 is connected, by a conductor 39, to the contact terminal 21 of the thermostatic element 13. The terminal 22 of the thermostatic element 18 is connected, by a conductor 41, to the switch terminal 37 and, by a conductor 42, to the conductor 16. One of the terminals of the motor 12 is connected to the switch terminal 36 by a conductor 43 and to the bi-metallic strip 19 by a conductor 44. The other end of the motor 12 is connected, by a conductor 45, to the supply-circuit conductor 14.

I have illustrated a specific application of the system embodying my invention in Fig. 2 of the drawing, in which a hot-water tank 46 has mounted thereon the thermostatic member 18. A secondary water container 47 has operatively mounted thereon the resistor or heating element 13, as well as the auxiliary thermostatic element 23. While no electrical connections are illustrated in Fig. 2 of the drawing, it is understood that these are in accordance with the diagram illustrated in Fig. 1 of the drawing. Suitable fluid pipes 48 and 49 connect the container 47 with the hot-water tank 46, which is connected to a supply pipe and an outlet pipe (not shown) in the usual manner.

In a water-heating installation of the kind illustrated in Fig. 2 of the drawing, it may happen that the water is drained out of the entire system, as in case of failure of the water pressure. When this happens, the temperature of the thermostatic element 18 may be relatively low, for the reason that there is no fluid medium circulating between the auxiliary heated container and the main water tank. The element 18 is, therefore, inoperative, as far as its ability to control the heating element 13 is concerned. If the water is drained out of the main and the auxiliary container, as hereinbefore described, the temperature of the heating element 13 and of the auxiliary container 47 increases very rapidly and the soldered joint 27 is softened, permitting a movement of the switch lever 28, thereby disengaging the same from the terminals 34 and 35 and engaging the terminals 36 and 37. In the diagram illustrated in Fig. 1, the full-line position of the contact bridging member of the switch 11 is shown in the position permitting of energizing the element 13. The bi-metallic strip 19 is shown in a position with its free end intermediate the two terminals 21 and 22.

If the temperature of the water in the main tank 46 becomes sufficiently high to cause the strip 19 to engage the terminal 22, the following control circuit is established: from the supply-circuit conductor 14 through conductor 45, motor 12, conductor 44, strip 19, terminal 22, conductors 42 and 16 and the switch 11 to the supply-circuit conductor 15. This causes the motor 12 to operate whereby the contact bridging member of the switch 11 is moved into the position illustrated by the broken lines in Fig. 1, thereby causing a de-energization of the heating element 13. If the temperature of the water becomes low enough to cause the free end of the strip 19 to engage the terminal 21, a control circuit is established substantially as follows:—from the supply-circuit conductor 14 through the conductor 45, motor 12, conductor 44, bi-metallic strip 19, terminal 21, conductor 39, terminal 34, through the switch blade to terminal 35, conductor 38 and the contact bridging member of the switch 11 to the supply-circuit conductor 15. This energizes the motor 12 and causes it to again move the contact bridging member of the switch 11 to the position illustrated by the full lines in Fig. 1, whereby the heating element 13 is energized.

If, as hereinbefore described, the temperature of the heating element or of the auxiliary container normally heated by the heating element becomes dangerously high, the solder joint 27 softens and permits the switch lever 28 to move to the position illustrated by the broken lines in Fig. 1, whereby it engages the terminals 36 and 37. This action disables the main thermostat 18 and simultaneously closes a control circuit substantially as follows:—from the supply-circuit conductor 14 through conductor 45, motor 12, conductor 43, terminal 36, the switch blade of lever 28, terminal 37, conductors 41, 42 and 16 and the contact bridging member of switch 11 to the other supply-circuit conductor 15. This causes the motor 12 to operate the switch 11 to its open circuit position, whereby the heating element 13 is de-energized.

The system embodying my invention thus provides a main thermal control means and an auxiliary thermal control means for controlling the operation of a heating-element controlling means. The main thermostat is automatic in its operation but the auxiliary thermostatic means, which is operatively associated with the heating element, is opened automatically but must be reset manually, thereby preventing current traversing the heating element after a dangerously high temperature thereof has once been reached until the operator has had an opportunity to inspect the system and assure himself that the proper operating conditions exist.

Various modifications may be made in the system embodying my invention without departing from the spirit and scope thereof, and I desire that only such limitations shall be placed thereon as are imposed by the prior art or are specifically set forth in the appended claims.

I claim as my invention:—

1. In an electric-heating system, in combination, an electric-heating element, electric means for controlling the energization of said element to maintain a substantially constant temperature, and a thermally operable temperature-limiting device for disabling said electric controlling means upon the occurrence of prdetermined temperature conditions.

2. In an electric-heating system, in combination, an electric-heating element, electric means for controlling the energization of said element to maintain a substantially constant temperature, and a thermally-operable and manually resettable temperature-limiting device for disabling said electric controlling means upon the occurrence of predetermined temperature conditions.

3. In an electric-heating system, in combination, an electric-heating element, temperature-controlled electric means for controlling the energization of said heating element to maintain a substantially constant temperature, and thermally-actuated electric means for de-energizing said electric controlling means upon the occurrence of predetermined temperature conditions, said de-energizing means having embodying means for preventing the re-energization of said controlling means until the temperature has been substantially reduced.

4. In an electric-heating system, in combination, an electric-heating element, thermally-actuated electric means for controlling the energization of said heating element, said control means being subjected to the temperature of the electrically-heated device, and a second thermally-actuated electric means for controlling the energization of said controlling means, said second electric means being subjected to the temperature of the electric-heating element.

5. In an electric-heating system, in combination, an electric-heating element, thermally-actuated electric means for controlling the energization of said heating element, said control means being subjected to the temperature of the electrically-heated device, and a second thermally-actuated electric means under the thermal influence of the electric heating element, for de-energizing said controlling means upon the occurrence of a predetermined temperature in the heating element.

6. In an electric-heating system, in combination, an electric-heating element, thermally-actuated electric means for controlling the energization of said heating element, said control means being subjected to the temperature of the electrically-heated device, and a second thermally-actuated electric means under the thermal influence of the electric heating element, for de-energizing said controlling means upon the occurrence of a predetermined temperature in the heating element, said de-energizing means being manually resettable only, to re-energize said controlling means.

7. In an electric-heating system, in combination, an electric-heating element, thermally-actuated electric means for controlling the energization of said heating element, said control means being subjected to the temperature of the electrically-heated device, and a second thermally-actuated electric means under the thermal influence of the electric heating element, for de-energizing said controlling means upon the occurrence of a predetermined temperature in the heating element, said de-energizing means being manually resettable to re-energize said controlling means only, when the temperature of the heating element has been substantially reduced below said predetermined value.

8. In an electric fluid-heating system, in combination, a fluid reservoir, a fluid heater-tank operatively connected to said reservoir, electric-heating means associated with said heater-tank, thermostatic means operatively associated with said reservoir for controlling the energization of said heating means, and an auxiliary thermostatic means operatively associated with said heater tank for causing the de-energization of said heating element upon the occurrence of a predetermined temperature in said heater-tank.

9. In an electric-heating system, in combination, an electric-heating element for heating a fluid, thermostatic means operatively associated with said fluid for limiting the temperature to which fluid may be heated, and auxiliary means operatively associated with said heating element for simultaneously disabling said first thermostatic means and causing the de-energization of said heating element upon the occurrence of a predetermined temperature therein.

10. In an electric heating system, the combination with a main fluid tank, an auxiliary fluid tank, an electric heating element operatively associated with said auxiliary tank, a switch for controlling the energization of said heating element and thermal means associated with said main tank for controlling the energization of said heating element, of a second thermal means operatively associated with said auxiliary container and comprising a solder-joint-controlled lever for disabling said first thermal means and for causing the de-energization of said heating element upon the occurrence of a predetermined temperature therein.

In testimony whereof, I have hereunto subscribed my name this second day of June, 1922.

FRANK THORNTON, Jr.